Feb. 21, 1956  S. BERSUDSKY  2,735,336
PROJECTOR FOR CASTING IMAGES OF OPAQUE OBJECTS UPON A SCREEN
Filed Feb. 7, 1955  2 Sheets-Sheet 1
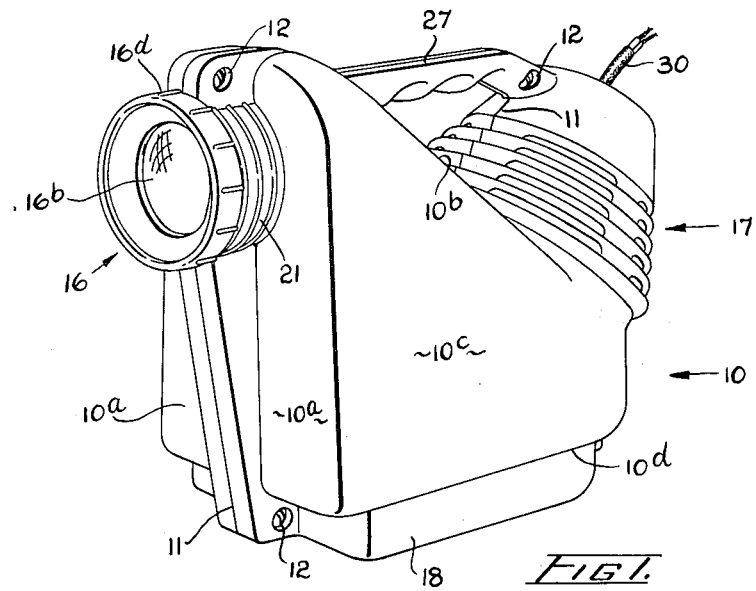
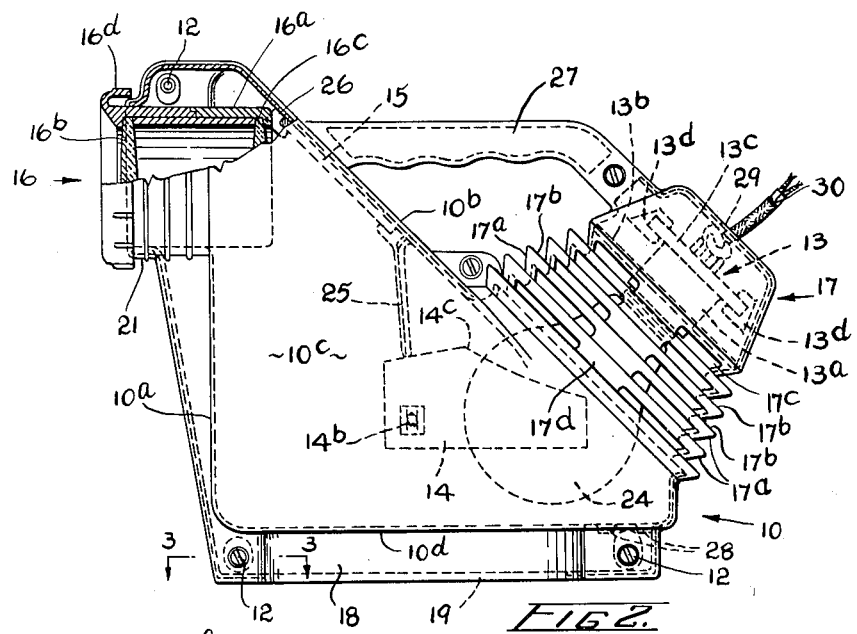
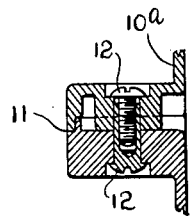
INVENTOR
SIDNEY BERSUDSKY
BY
Maybee & Legris
ATTORNEYS.

Feb. 21, 1956   S. BERSUDSKY   2,735,336
PROJECTOR FOR CASTING IMAGES OF OPAQUE OBJECTS UPON A SCREEN
Filed Feb. 7, 1955   2 Sheets-Sheet 2
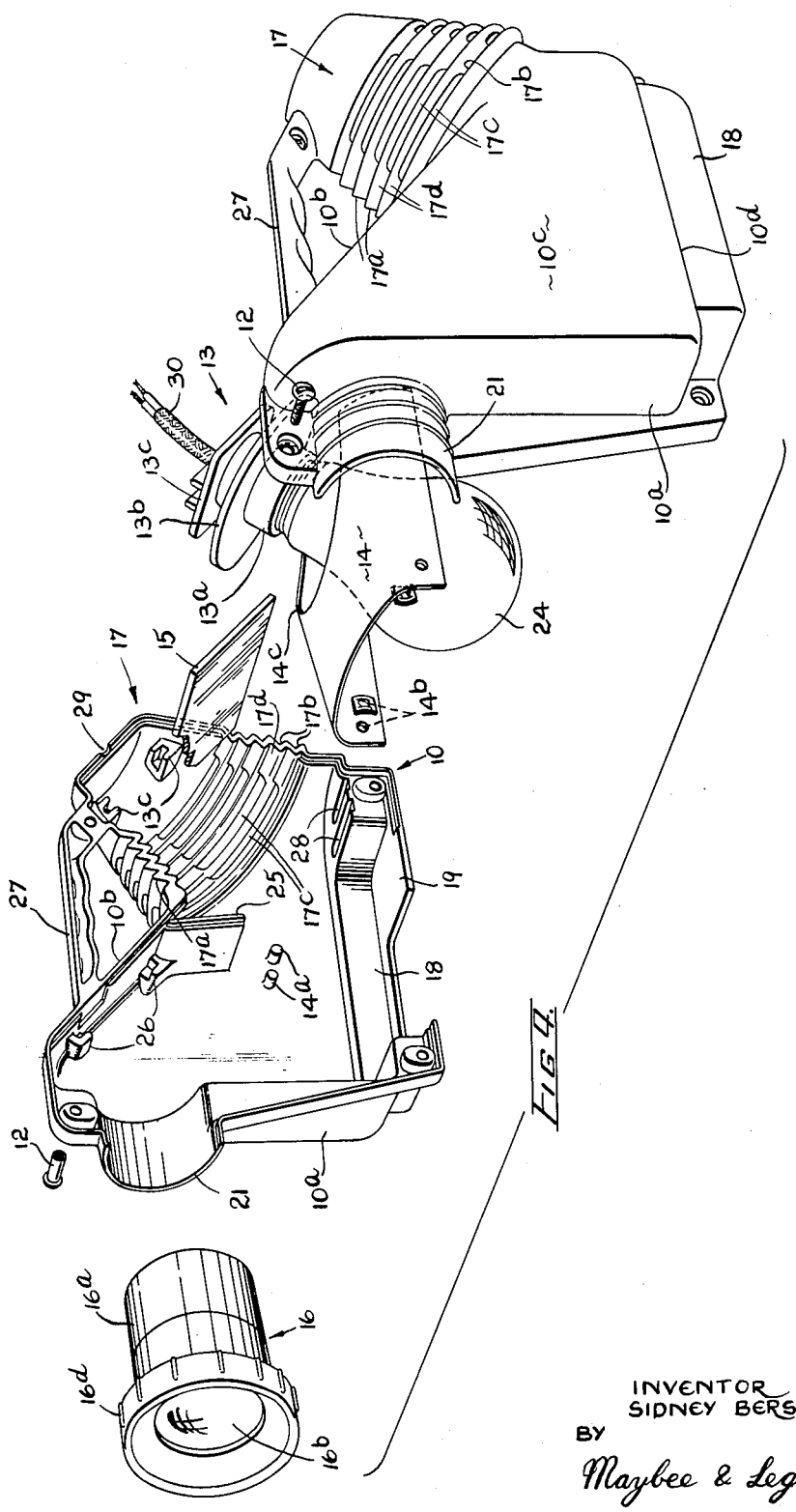
INVENTOR
SIDNEY BERSUDSKY
BY
Maybee & Legris
ATTORNEYS

United States Patent Office 2,735,336
Patented Feb. 21, 1956

2,735,336

PROJECTOR FOR CASTING IMAGES OF OPAQUE OBJECTS UPON A SCREEN

Sidney Bersudsky, Toronto, Ontario, Canada, assignor to Kelton Corporation Limited, Toronto, Ontario, Canada, a corporation Application February 7, 1955, Serial No. 486,314

5 Claims. (Cl. 88—24)

This invention relates to a projector or lantern for projecting images of opaque objects onto a suitable screen, and particularly to a toy projector of this type.

The principal object of this invention is to provide such a projector of small size, utilizing a light source of relatively low power and adapted for low-cost manufacture. A projector having these characteristics is suitable for use as a toy.

A further object of the invention is to provide a projector of this type which, though small in size, will provide for efficient dissipation of heat from the light source without the provision of a blower or fan and which is composed of heat-insulating material, to ensure that it will remain sufficiently cool on its outer surfaces to make it safe for use by children.

A further object of this invention is to provide a projector of this kind having a casing which may be moulded from a synthetic resin or plastic in two half sections which lend themselves to quick and easy assembly with the internal parts of the projector.

These objects are attained by the invention as disclosed in the following description and the accompanying drawings.

In the drawings, illustrating a preferred embodiment of the invention each reference character denotes the same part in all the views, and Fig. 1 is a perspective view of the assembled projector according to the invention, Fig. 2 is a side elevation of the projector partly broken away to show the lens assembly and showing certain internal parts in dotted lines, Fig. 3 is a section along line 3—3 of Fig. 2, and Fig. 4 is a perspective view of the parts shown in spaced relationship to illustrate their relative positions when assembled.

The projector casing 10 is formed in two symmetrical halves preferably joined at the parting line 11 by means of male and female screws 12. The casing 10 provides mountings for a lamp assembly 13, a reflector 14, a mirror 15 and a lens assembly 16. The general shape of the casing is such that it is adapted to be compression moulded from a thermosetting synthetic resin and to be quickly and easily assembled. The material should also be a reasonably good-heat insulator. The casing is shaped somewhat like a triangular prism with truncated smoothly rounded corners, and having a vertical front face 10a, a sloping top face 10b, vertical side faces 10c and a narrow peripheral bottom face 10d. At the inner edges of the bottom face 10d there is a continuous vertical flange 18 supporting a bottom wall 19 which has a rectangular aperture 20 designed to register with the copy or article to be projected. A truncated cone-shaped slotted dome 17 is disposed near the lower end of the upper face 10b and communicates through its circular base with the interior of the casing 10. Near the top of the front face 10a there is a short cylindrical barrel 21 extending horizontally and providing a cylindrical lens housing. A handle 27 bridges the distance between the upper end of the dome 17 and the upper end of the sloping surface 10b of the casing to enable the projector to be conveniently carried from place to place.

The slotted dome 17 projects substantially at right angles from the sloping top face 10b of the casing so as to provide as much exposed wall surface as possible for air cooling. The conical wall of the dome is formed with concentric corrugations as best seen in the sectional view of Fig. 4, thus providing inwardly sloping annular wall sections 17a which join lateral annular wall sections 17b disposed substantially at right-angles to the axis of the dome. This construction provides circumferential V-shaped grooves between V-shaped ridges on the outside of the dome wall. In each groove four slots 17c, each extending over slightly less than one-quarter of the circumference of the groove, are provided by eliminating circumferential portions of the sloping wall sections 17a. The circumferential intervals between the slotted portions provide spaced apart support sections 17d, and the ridges provide a series of stepped disc-like baffles which shield the eyes of the user from the source of light.

The lamp assembly 13 is mounted inside the dome 17. It consists of a lamp socket 13a which carries an annular foil-coated asbestos heat baffle 13b and which has a rectangular base plate 13c adapted to be retained in the upper portion of the dome 17. This upper portion is unslotted and it is provided with four notched projections 13d on its inside surface. There are two of these projections in each half of the casing and they are disposed at the four corners of a rectangle to engage the four corners of the rectangular base plate 13c. Thus the lamp assembly is conveniently secured in the dome by engaging the corners of the base plate with the projections 13d when the two halves of the casing are assembled together. Small semi-circular openings 29 are provided in the upper end of the dome 17, one on each side of the parting line 11, so that when the casing is assembled a circular hole is provided for a cord 30 to connect the lamp socket 13a to a source of electric power. A lamp 24 is fitted in the socket 13a and the dimensions of the dome 17 are such that the major portion of the lamp is disposed within the ventilated portion of the dome, while the heat baffle 13b fits into one of the ridges in the corrugated wall of the dome 17. The axis of the lamp and the dome 17, if extended downwardly, would pass approximately through the center of the aperture 20 in the bottom wall 19 of the casing. Air inlet slots 28 are provided in the peripheral bottom wall 10d beneath the dome 17. Convention currents caused by the heat of the lamp 24 cause air to flow into the casing through these slots 28 and out through slots 17a in the dome, thus helping to cool the light source.

In order to reflect some of the light from the lamp which would otherwise be absorbed in the interior of the casing, a reflector 14 of thin, flexible sheet metal having a polished surface is disposed partly above and around the lower part of the lamp 24. Spaced lugs 14a are arranged on the inside surfaces of the side walls of the casing to engage corresponding apertures 14b in the reflector. The reflector, when installed, is bent so as to fit closely around the lamp lying over the enlarged portion of the bulb and to extend downwardly at either side; it is held in place by engagement with the lugs 14a. A notch 14c is cut in the reflector 14 to enable it to more closely encompass the bulb and thus capture and reflect the greater amount of light.

A baffle 25 extending downwardly from the inside of the sloping top wall 10b in front of and above the bulb 24 prevents the light of the lamp reaching the upper portion of the interior of the casing, particularly the neighbourhood of the lens assembly 16, and also serves as a bearing or supporting surface for a portion of the reflector 14. Between the baffle 25 and the upper corner of the casing, notched projections 26 are provided on the inside surface of face 10b to co-operate, when the two halves of the projector are assembled together, for engagement with the corners of a mirror 15. The mirror will be thus secured with its back in contact with the sloping top face 10b of the casing.

The lens assembly is contained in a cylindrical tube 16a and consist of two lenses 16b and 16c, each mounted near one end of the tube. The tube 16a has a sliding fit within the barrel 21 and can be advanced or retracted in the barrel with respect to the mirror 15 to adjust the focus of the lens for producing a clear and sharp image of the copy or article on a suitable projection surface or screen. The forward end of the tube 16a is provided with a convenient gripping surface 16d to facilitate this adjustment.

In use, the projector is placed upon a sheet of illustrated or printed matter with the aperture 20 in register with that portion which is to be projected. The lamp 24 is connected to a source of electric power, and the position of the lens assembly 16 is adjusted in the barrel 21 until a clear and sharply defined image appears on the screen. The size of the image may be adjusted by varying the distance of the projector from the screen. The light emitted by the lamp 24 is directed to and reflected from the copy or article to the mirror 15, and thence passes through the lenses 16b and 16c to the screen.

From the foregoing description it will be seen that the described and illustrated embodiment of the invention accomplishes the objects set forth above and provides a small projector using a light source of relatively low power which is easy and economical to manufacture.

The description and drawings have dealt with only one form which the invention may take and it is to be understood modifications may be made in the construction and shape of the device without departing from the spirit of the invention, the scope of which is defined in the appended claims.

What I claim as my invention is:

1. A projector for casting images of opaque objects on a projection surface comprising a casing of substantially prismic form having a front face, a top face sloping downwardly from the top of the front face, and a base having an aperture adapted to register with a surface having representations to be projected, a lens assembly in the front face, a hollow dome extending from the lower end of the sloping top face, a light source mounted in the dome to illuminate the said surface, and a mirror inside the sloping top face to reflect light from the said surface through the lens assembly to the projection surface, the dome wall having closely spaced circumferential ridges and having slots between the adjacent ridges to provide ventilation, the ridges adjacent the slots forming disc-like baffles in a stepped arrangement shielding the eyes of a person behind the projector from the light which escapes through the ventilating slots from the lamp.

2. A projector for casting images of opaque objects on a projection surface comprising a casing of substantially prismic form having a front face, a base having an aperture adapted to register with an article to be projected, and a top face sloping downwardly from the top of the front face to the rear of the base, a lens assembly in the front face, a hollow dome extending substantially normally from the lower end of the sloping top face, a light source mounted in the dome to illuminate the said surface, and a mirror inside the sloping top face to reflect light from the said surface through the lens assembly to the projection surface, the dome wall having stepped circumferential corrugations providing alternate sloping annular wall sections and lateral annular wall sections defining circumferential V-shaped grooves between V-shaped ridges on the dome wall, circumferential portions of the sloping wall sections being cut out to provide apertures between a series of stepped disc-like baffles shielding the eyes of a person behind the projector from the light source.

3. An opaque projector comprising a casing of substantially prismic form having a front face, a top face sloping downwardly from the top of the front face, and a base having an aperture adapted to register with an article to be projected, a lens assembly in the front face, a hollow dome extending normally from the lower end of the top face, ventilating apertures in the wall of the dome, a lamp in the dome to illuminate the article to be projected, a reflector of thin, flexible sheet material secured above and curving around the lower part of the lamp, projections on the wall of the casing engaging the said reflector, and a mirror inside and adjacent the top face to reflect light from the illuminated article to the lens assembly.

4. An opaque projector as claimed in claim 3 in which the projections are lugs arranged on the inside surfaces of the walls of the casing and the reflector has apertures in which the lugs engage to maintain the reflector in an arched configuration over the lamp.

5. An opaque projector comprising a casing of substantially prismic form moulded from a synthetic resin in two half-sections joined along a vertical parting line and having a front face, a top face sloping downwardly from the top of the front face, and a base having an aperture adapted to register with an article to be projected, a lens assembly in the front face, a hollow dome extending normally from the lower end of the top face, ventilating apertures in the wall of the dome, notched projections on the inside surface of the dome, a lamp socket having a base plate engaged by the notches in the projections when the two halves of the casing are assembled together, a lamp in the socket to illuminate the article to be projected, and notched projections on the inside of the top face in each half of the casing, and a mirror engaged by the notches in the projections when the two halves of the casing are assembled together so as to reflect light from the illuminated article to the lens assembly.

References Cited in the file of this patent

UNITED STATES PATENTS

| | | |
|---|---|---|
| 1,616,747 | Harnett | Feb. 8, 1927 |
| 1,807,614 | Bauersfeld et al. | June 2, 1931 |
| 1,848,378 | Ott | Mar. 5, 1932 |
| 1,904,695 | Plies | Apr. 18, 1933 |
| 2,366,554 | Peck et al. | Jan. 2, 1945 |
| 2,570,507 | Andreoli | Oct. 9, 1951 |